United States Patent [19]

Herzog et al.

[11] 4,041,053
[45] Aug. 9, 1977

[54] PROCESS FOR THE PREPARATION OF ANTHRAQUINONE COMPOUNDS

[75] Inventors: Helmut Herzog, Leverkusen; Hans-Samuel Bien, Burscheid; Walter Hohmann, Leverkusen, all of Germany

[73] Assignee: Bayer Aktiengesellschaft, Leverkusen, Germany

[21] Appl. No.: 669,893

[22] Filed: Mar. 24, 1976

[30] Foreign Application Priority Data

Mar. 29, 1975 Germany .............................. 2513950

[51] Int. Cl.² .............................................. C09B 1/16
[52] U.S. Cl. .......................................... 260/381; 8/3; 8/4; 8/39 R
[58] Field of Search ......................................... 260/381

[56] References Cited

U.S. PATENT DOCUMENTS

| | | | |
|---|---|---|---|
| 2,348,013 | 5/1944 | Lulek et al. ........................... | 260/367 |
| 2,487,045 | 11/1949 | Dickey et al. ................... | 260/381 X |
| 3,462,463 | 8/1969 | Schwander et al. ............ | 260/381 X |
| 3,499,915 | 3/1970 | Schwander et al. ............ | 260/381 X |

FOREIGN PATENT DOCUMENTS

| | | | |
|---|---|---|---|
| 1,461,074 | 10/1966 | France .......................... | 260/381 UX |
| 212,470 | 4/1908 | Germany ...................... | 260/381 UX |

*Primary Examiner*—Paul F. Shaver
*Attorney, Agent, or Firm*—Plumley and Tyner

[57] ABSTRACT

The invention relates to the preparation of partially known anthraquinone compounds of the formula

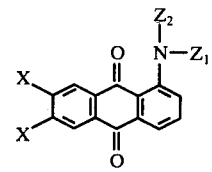

wherein $Z_1$ represents an optionally substituted hydrocarbon radical, $Z_2$ represents hydrogen or alkyl, one X represents a chlorine atom and the other X denotes a hydrogen atom, by subjecting technical chloroanthraquinone mixtures to a fractional vacuum distillation and reacting the 1,6(1,7)-dichloranthraquinone fraction thereby obtained with amines of the formula $HNZ_1Z_2$.

Moreover the invention relates to novel compounds of the above formula wherein $Z_2$ is H and $Z_1$ is alkyl, alkenyl, aralkyl or cycloalkyl. They are good dyestuffs for synthetic fibres or dyestuff intermediates.

5 Claims, No Drawings

PROCESS FOR THE PREPARATION OF ANTHRAQUINONE COMPOUNDS

The present invention relates to a process for the preparation of anthraquinone compounds of the formula

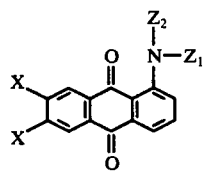

wherein $Z_1$ represents an optionally substituted hydrocarbon radical, $Z_2$ represents hydrogen or alkyl, one X represents a chlorine atom and the other X denotes a hydrogen atom.

The process is characterised in that technical chloroanthraquinone mixtures are subjected to a fractional vacuum distillation and the 1,6(1,7)-dichloroanthraquinone fraction thereby obtained is reacted with amines of the formula $HNZ_1Z_2$, with replacement of the α-chlorine atom.

Suitable hydrocarbon radicals are alkyl, alkenyl, cycloalkyl, aralkyl or aryl radicals, which can optionally be substituted by non-ionic substituents which are customary in dyestuff chemistry.

The chloroanthraquinone mixtures can be of very diverse origin and composition.

Suitable mixtures are those which arise on so-called "Fischering" (compare Ullmanns Encyklopaedie der technischen Chemie (Ullmanns Encyclopaedia of Industrial Chemistry), 4th edition, volume 7, page 589 and German Patent Specification 205,195) of aqueous solutions of anthraquinonesulphonic acids, especially of industrial effluents which contain these products.

Effluents such are known to arise from the α-disulphonation of anthraquinone, carried out in the presence of mercury, after removal of the two main products (1,5- and 1,8-disulphonic acid) are particularly suitable.

Where the objective of the α-disulphonation is not the isolation of the pure isomer fractions it is of course possible to subject the entire disulphonation batch, that is to say without prior isolation of a fraction, to "Fischering".

A further preferred process variant is to use mother liquors (effluents) which arise from the α-monosulphonation of anthraquinone after isolation of anthraquinone-1-sulphonic acid. It is advantageous to use mother liquors from the α-sulphonation, from which the mercury has beforehand been removed in a manner which is in itself known (compare DOS (German Published Specification) No. 2,124,261 and DOS (German Published Specification) No. 2,163,674).

The halogenation, the so-called "Fischering", is advantageously carried out by introducing alkali metal chlorates, preferably sodium chlorate, into the hot solution of the sulphonic acids in hydrochloric acid.

However, the "Fischering" can be carried out by introduction of chlorine with simultaneously irradiation with UV, or by reaction with elementary bromine.

The presence of hydrochloric acid in the medium can be achieved by addition of hydrochloric acid or as a result of the hydrochloric acid having been produced from the salts, such as KCl and NaCl, added to precipitate the sulphonic acids, say in the case of the effluents, containing sulphuric acid, which are to be used preferentially.

The water-insoluble chloroanthraquinones produced on "Fischering" of mother liquors of the sulphonation of anthraquinone are isolated by filtration, washed as free from acid as possible, dried and subsequently subjected to fractional distillation in vacuo.

Further suitable chloroanthraquinone mixtures are those which arise from the action of elementary chlorine on technical mononitration products or dinitration products of anthraquinones [obtained, for example, in accordance with the instructions of DOS (German Published Specification) No. 2,143,253 (= U.S. Pat. No. 3,818,052), DOS (German Published Specification) No. 2,306,611 (= Belgian Pat. No. 810,771) and DOS (German Published Specification) No. 2,256,664 (= Belgian Pat. No. 807,383)].

Amongst these, in turn, preferred sump products containing dinitroanthraquinone mixtures, especially waste mother liquors, are preferred which arise from the dinitration of anthraquinone (optionally in the presence of sulphuric acid or perfluoroalkanesulphonic acids) in highly concentrated, 94–100% strength nitric acid, after isolating the 1,5- and 1,8-dinitroanthraquinone.

Of course, it is also possible to employ, as starting products for the process of the invention, those 1,6(1,7)-dinitroanthraquinone fractions which arise from the separation, known from the literature (compare DOS (German Published Specification) 2,143,253; Helv. 14, 1404 and DOS (German Published Specification) 2,248,704) of dinitroanthraquinone mixtures containing predominantly 1,5-, 1,8-, 1,6- and 1,7-dinitroanthraquinone.

The conversion of the mother liquors from the dinitration of anthraquinone into the corresponding dichloroanthraquinones is advantageously carried out by evaporating the mixture, then fusing a mixture of the residue with chloroanthraquinones, the proportion of the halogenoanthraquinones serving as a diluent being at least 10 per cent by weight, treating this melt with elementary chlorine at 180° to 300° C, preferably 240° to 280° C and distilling the reaction mixture after completion of the reaction. It is particularly advantageous to use, as a diluent, those chloroanthraquinones which are derived from the dinitroanthraquinones employed by substitution of the nitro groups by chlorine.

The ratio in which the dinitroanthraquinone and halogenoanthraquinone are mixed, and which must be adjusted at the beginning of the reaction, depends on the melting characteristics of the dinitroanthraquinones. Advantageously, the ratio is so chosen that a melt which is as mobile as possible and can be stirred or pumped readily is produced. In the discontinuous process, mixtures which contain 10 to 50 per cent by weight of a dinitroanthraquinone (the remainder being halogenoanthraquinone) are in general employed.

In the continuous method, technical or pure chloroanthraquinone, in the molten form, is first taken and the dinitroanthraquinone is added in such amount that it reacts in the desired manner with the halogen introduced.

The reaction can be followed by means of thin layer chromatography or gas chromatography. It is complete as soon as no further nitrous gases are evolved and no further dinitroanthraquinones are detectable.

The chloroanthraquinones employed as the diluent can, as has been described in detail above, be obtained from anthraquinone sulphonation effluents by "Fischering".

The chlorination of the waste products of the dinitration of anthraquinone can also be carried out in inert organic solvents such as, for example, trichlorobenzene, at the reflux temperature (compare German Patent Specification No. 254,450), but in that case substantially longer reaction times are needed than in the case of the process described above; furthermore, greater waste air problems arise (evolution of chlorine and nitrosyl chloride). After completion of the reaction, the solvent must be stripped off (which entails higher energy costs); thereafter, the reaction mixture is distilled in vacuo.

Depending on the nature of the industrial mother liquors from the anthraquinone sulphonation or dinitration, used to manufacture the technical chloroanthraquinones, the latter contain varying amounts of all possible monochloro, dichloro and trichloro isomers.

Carrying out the vacuum distillation of the halogenoanthraquinones discontinuously in practice comprises distilling the technical chloroanthraquinones in an adiabatically heated rectifying column (high vacuum column with metal fabric packing or other metal packings; compare Ullmann, Encyklopaedie der technischen Chemie (Encyclopaedia of Industrial Chemistry), 4th edition, volume 2, page 533 and page 528), the activity of which corresponds to 20–50 theoretical plates, at a top vacuum of 5 to 25 mm Hg and a reflux ratio of 5/1 to 50/1, the distillation being carried out at temperatures which lie 30° to 50° C above the melting point of the chloroanthraquinone mixtures.

The distillative purification of the technical chloroanthraquinone mixtures can be carried out particularly advantageously in a continuously operating installation.

This variant of the process is characterised in that chloroanthraquinone mixtures which are as free as possible from acid and which contain 1-chloro-, 2-chloro-, 1,5-dichloro-, 1,6-dichloro-, 1,7-dichloro-, 1,8-dichloro- and possibly 1,4,5-trichloro-anthraquinone are fused in a suitable manner — for example in a melting screw — and thereafter the melt is freed from products which are distillable in an evaporation installation which provides a short residence time and little loss of pressure, for example in a thin layer evaporator. The melt which has been pre-purified in this way is fed continuously to the middle zone of an adiabatically heated high vacuum rectifying column with 20–50 theoretical plates and the rectification is carried out in such a way that the 2-chloroanthraquinone is taken off at a minimum purity of 94% at the top of the column, using a vacuum of 5–25 mm Hg and a reflux ratio of 5–50.

The sump (which is practically free from 2-chloroanthraquinone) is also fed continuously to the middle zone of a second rectifying column from the top of which 1-chloroanthraquinone which is at least 94% pure is taken off. This sump product is fed into the middle zone of a third column in which an at least 94% pure binary mixture of 1,6- and 1,7-dichloroanthraquinone is taken off at the head; thereafter, the sump is fed into the middle zone of a fourth column and an at least 94% pure binary mixture of 1,5- and 1,8-dichloroanthraquinone is taken off at the head. If desired, 1,4,5-trichloroanthraquinone is isolated from this sump, for example by feeding it to a thin layer evaporator.

If chloroanthraquinones of a different composition are used, it may at times be possible to dispense with one or two of the columns described above.

The degree of purity of the fractions obtained by continuous or discontinuous distillation naturally depends on the purity of the starting materials and the requirements to be met by the halogenoanthraquinones during further processing to give dyestuffs. When using chloroanthraquinone mixtures from the abovementioned effluents or mother liquors it is industrially reasonable to aim at a degree of purity of about 95%.

"Fischering" of the mother liquors from the monosulphonation or disulphonation of anthraquinone and chlorination of the sump products of the dinitration of anthraquinone gives chloroanthraquinone mixtures which can be separated, by means of fractional high vacuum distillation, into various monochloroanthraquinone and dichloroanthraquinone compounds, as has been described above.

In this procedure, large quantities of a binary mixture of 1,6- and 1,7-dichloroanthraquinone are produced, for which there was previously no industrial use.

In the last stage of the process according to the invention, these dichloroanthraquinones are reacted with any desired aliphatic, araliphatic, cycloaliphatic or aromatic amines under the conditions indicated later.

Examples of suitable aromatic amines are aniline, o-, m- and p-toluidine, o-, m- and p-anisidine, 4-tert.butyl-aniline, 2-methyl-4-tert.butyl-aniline, mesidine, 4-cyclohexyl-aniline, o-, m- and p-chloroaniline, m-trifluoromethylaniline, o-, m- and p-hydroxyaniline, o-, m- and p-phenetidine, o- and p-propoxy-aniline, m- or p-phenylenediamine, N-methyl-p-phenylenediamine, N-acetyl-m-phenylenediamine and N-acetyl-p-phenylenediamine.

A further subject of the present invention is a new process for the preparation of 1-amino-6(7)-chloroanthraquinones of the general formula I (and especially of their mixtures)

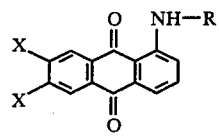

(I)

in which
R represents an optionally substituted alkyl, alkenyl, cycloalkyl or aralkyl radical,
one X represents a chlorine atom and
the other X represents hydrogen and their use for dyeing and printing synthetic fibres and for bulk dyeing of plastics. The process is characterised in that chloroanthraquinones of the general formula II (or their mixtures)

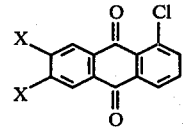

(II)

in which
one X represents a chlorine atom and the other X represents hydrogen are reacted, at temperatures of 50°-200° C, preferably at 80° 150° C, with amines of the formula III $$H_2N—R \quad (III)$$

wherein

R has the abovementioned meaning, in the presence of acid-binding agents and optionally in the presence of organic solvents or water and copper or copper salts as the catalyst.

Suitable alkyl and alkenyl radicals are those with 1-12 C atoms, such as methyl, ethyl, n- or iso-propyl, allyl, n-, iso- and tert.-butyl, hexyl or dodecyl radicals, which can optionally have a further substitutent, for example cyano, hydroxyl, nitro, halogen, amino, alkoxy, alkoxycarbonyl, alkoxycarbonyloxy alkylcarbonyloxy, acylamino, alkylcarbonylamino, alkylsulphonyl, arylsulphonyl, alkylaminocarbonyloxy, alkylmercapto, monoalkylamino and dialkylamino, aryloxy, arylcarbonyloxy and alkylaminosulphonyloxy.

The alkyl and alkoxy groups are preferably those with 1-4 C atoms; the aryl groups are preferably phenyl radicals which optionally have 1-3 substitutents from amongst halogen, $C_1$-$C_4$-alkyl or $C_1$-$C_4$-alkoxy.

Suitable araliphatic radicals are, in particular, phenyl-$C_{1-8}$-alkyl radicals which optionally have 1-3 further substituents from amongst halogen (especially Cl, F and Br), $C_1$-$C_4$-alkyl, cyclohexyl, $C_1$-$C_4$-alkoxy, $NH_2$, $NO_2$ and $C_{2-5}$-alkylcarbonylamino, for example phenylmethyl, $\alpha$- or $\beta$-phenylethyl, $\gamma$-phenylpropyl, $\gamma$-phenyl-$\alpha$-methylpropyl, $\beta$-phenyl-$\alpha$-methylethyl, $\gamma$-phenyl-$\alpha,\gamma,\gamma$-trimethylpropyl, $\alpha$-($\beta$-phenylethyl)-$\gamma$-methylbutyl, $\alpha$-isopropyl-$\gamma$-phenylpropyl and $\alpha$-cyclohexyl-$\gamma$-phenylpropyl.

Suitable cycloaliphatic radicals are cyclopentyl, cycloheptyl, cyclohexyl and cyclohexyl monosubstituted, disubstituted or trisubstituted by $C_{1-8}$-alkyl; benzylcyclohexyl which is optionally substituted in the phenyl radical by Cl or $C_1$-$C_4$-alkyl, such as (o- or p-benzyl)-cyclohexyl and 2-benzyl-3,3,4-trimethyl-cyclohexyl; p-bis-cyclohexyl, p-benzylaminocyclohexyl, phenylcyclohexyl, phenoxycyclohexyl, hydroxycyclohexyl, $C_{1-4}$-alkoxycyclohexyl, aminocyclohexyl, $C_1$-$C_4$-alkylaminocyclohexyl, acylaminocyclohexyl, $C_2$-$C_5$-alkylcarbonylaminocyclohexyl and halogenocyclohexyl, such as chlorocyclohexyl or bromocyclohexyl.

The starting materials for the process according to the invention, namely 1,6- and 1,7-dichloroanthraquinone or especially their mixtures II, are obtained, as has been described in detail above, by vacuum distillation of the technical chloroanthraquinones.

Particularly suitable amines of the formula III which may be mentioned are aliphatic amines, for example methylamine, ethylamine, (n- and iso-)propylamine, (n-, iso, sec.- and tert.-)butylamine, $\beta$-hydroxyethylamine, 3-aminopentane and 3-methoxypropylamine; cycloaliphatic amines, such as, for example, cyclohexylamine, hexahydro-o-, m- and -p-toluidine, hexahydro-p-phenylenediamine, hexahydro-aminophenyl, 2- or 4-benzylcyclohexylamine, 4-tert.-butylcyclohexylamine and halogenated cyclohexylamines; araliphatic amines, such as, for example, benzylamine, 1-phenyl-1-aminoethane, 1-phenyl-2-aminoethane, 1-phenyl-3-aminobutane, 1-phenyl-2-aminopropane, 1-phenyl-5-methyl-hexylamine-(3), 1-phenyl-3-cyclohexyl-propylamine-(3) and 2-phenyl-3-methyl-pentylamine-(4).

Suitable organic solvents for the preparation of I from II and III can be either hydrophobic or hydrophilic in nature. Hydrophobic solvents which may be mentioned are halogenated or nitrated hydrocarbons of the aliphatic or aromatic series, for example $\alpha,\beta$-dichloroethane, $\alpha,\alpha,\beta,\beta$-tetrachloroethane, chlorobenzene, o-dichlorobenzene, trichlorobenzenes, $\alpha$-chloronaphthalene or, preferably, nitrobenzene. Hydrophilic solvents which may be mentioned are tertiary bases of aliphatic or aromatic nature, such as, for example, triethyanolamine, pyridine, methylpyridine, cyclic ethers, such as dioxane, alkylformamides, such as dimethylformamide, alkylsulphoxides, such as dimethylsulphoxide, cyclic sulphones, such as sulpholane, or water.

Finally, it is also possible, with advantage, to use, as the solvents, excess amines of the formula III, preferably those which are liquid at the reaction temperature.

To neutralise the hydrochloric acid initially split off during the reaction it is possible to add acid-binding agents, such as salts of weak inorganic or organic acids, for example sodium salts, potassium salts and magnesium salts of carbonic acid or acetic acid, or tertiary organic bases, for example triethanolamine or pyridine, or inorganic bases, such as magnesium oxide or calcium oxide. The reaction temperatures depend on the nature of the amine to be converted and on the concentration of the reactants. The reactions can be carried out at 50° - 200° C, but preferably at 80° - 150° C, under normal pressure or at an elevated pressure in an autoclave.

The reaction times, which depend on the nature of the amine to be reacted, on the chosen reaction temperature and on the concentration of the reactants are in general 1 to 10 hours. Under the reaction conditions mentioned, only the chlorine atom in the $\alpha$-position reacts.

The reaction products can be isolated in a manner which is in itself known by dilution with low moleclular alcohols or by evaporation of the reaction melt or, if excess amine has been used as the solvent, by dilution with optionally aqueous mineral acids or organc acids.

A further subject of the invention are new anthraquinone compounds of the formula

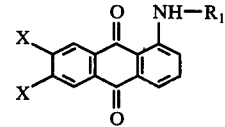

(IV)

as well as their mixtures,
wherein $R_1$ represents optionally substituted cycloalkyl, aralkyl or straight-chain $C_2$-$C_{12}$ alkyl and X has the abovementioned meaning.

The meaning of the cycloalkyl and aralkyl radicals $R_1$ corresponds to the radicals R.

Preferred compounds of the formula IV are those wherein $R_1$ represents cyclopentyl, cycloheptyl, cyclohexyl, methylcyclohexyl, dimethylcyclohexyl, trimethylcyclohexyl, chlorocyclohexyl, benzyl, $\alpha$-phenylethyl, $\beta$-phenylethyl, chlorobenzyl, methylbenzyl or methoxybenzyl.

Compounds of the formulae I and IV are very suitable for dyeing organic materials, especially for dyeing and/or printing fibres, filaments, woven fabrics, knitted fabrics, tapes, films or sheets of synthetic origin, but above all for dyeing and printing hydrophobic fibre material, such as cellulose esters, polyamide, polyacrylonitrile and polyesters. A great diversity of dyeing and printing processes can be used, for example the exhaustion process using carriers, the high temperature process, the thermosol process or the transfer printing process.

Brilliant dyeings and prints having good fastness properties are obtained.

The dyestuffs I or IV are, however, also very suitable for bulk dyeing of plastics, such as polycarbonates, polymethacrylates, polyamides, polyolefines, polystyrene and linear polyesters; for dyeing the plastics mentioned, they are used in proportions of 0.005 to 1%, especially 0.05-0.5%, relative to the amount of plastic.

The dyestuffs are mixed dry, or ground dry, with the plastics granules and this mixture is plasticised and homogenised, for example on mixing mills or in extruders. The material which has been pre-coloured in this way is processed further, for example by extrusion or by the injection moulding process, to give shaped articles. Moulded articles of any desired shape, in red shades having good fastness properties, are obtained.

In addition, compounds of the formula I or IV are also valuable intermediate products for the preparation of anthraquinone dyestuffs which are accessible, for example, by halogenation, subsequent reaction with aliphatic or aromatic amines and subsequent sulphonation (compare, for example, French Pat. No. 1,461,974) or quaternisation.

The particular advantage of the process according to the invention for the preparation of the aminoanthraquinones of the formula I, which are interesting dyestuffs or dyestuff intermediate products, is that waste products which have hitherto been valueless (for example mother liquors and effluents from the sulphonation of anthraquinone, and sump products from anthraquinone nitration reactions) can be used as starting materials, and this in turn is of particular economic significance in view of the current increasing shortage of anthraquinone.

The process according to the invention will be explained in more detail with the aid of the examples which follow.

EXAMPLE 1 a. 2,100 kg of oleum (20% strength) are reacted with 15 kg of mercury sulphate and 2,100 kg of anthraquinone for 3 hours at 120° C, in accordance with the instructions in "Ullmanns Encyklopaedie der technischen Chemie (Ullmann's Encyclopaedia of Industrial Chemistry), 4th Edition, Volume 7, page 587". The reaction mixture is diluted with 7,000 l of water and filtered, and the product is washed with 12,000 l of water until neutral. The anthraquinone-1-sulphonic acid is precipitated from the filtrate as the potassium salt by means of 1,800 l of concentrated KCl solution and the potassium salt is filtered off. The mother liquor thereby obtained is collected and worked up in accordance with Example 1c.

b. 960 kg of oleum (5% strength)/8 kg of mercury are added to 800 kg of anthraquinone and reacted with 900 kg of oleum (65% strength) at 120°-125° C (compare BIOS Final Report No. 1,484, p. 10 and "Ullmanns" (compare above), page 588).

After dilution with sulphuric acid, the 1,5-disulphonic acid is next precipitated and separated off. The 1,8-disulphonic acid is salted out from the filtrate by means of KCl. The mother liquors obtained after separating off the potassium salt of this acid are collected and worked up in accordance with Example 1c.

c. 80 l of the mother liquors obtained according to Example 1a and 40 l of the mother liquors obtained according to Example 1b are combined in a 250 l enamelled kettle and heated to 100° C. At this temperature, 12 l of a 10% strength aqueous sodium chlorate solution are added uniformly over the course of 4 hours whilst stirring (30-40 revolutions per minute, anchor stirrer). The mixture is stirred for a further 2 hours at 100° C, the product is filtered off on a filter press at 80° C and is washed with hot water until the liquor which issues reacts neutral, and the filter cake is dried.

1,800 g of a chloroanthraquinone mixture of the following composition are obtained: 22% of 2-chloroanthraquinone, 22% of 1-chloroanthraquinone, 34% of 1,6- and 1,7-dichloroanthraquinone, 16% of 1,5- and 1,8-dichloroanthraquinone and 6% of 1,4,5-trichloroanthraquinone.

1,500 g of this mixture are introduced into an electrically heated flask, of a particularly flat design, of a discontinuously operating distillation column. The column consists of 2 stages (nominal internal diameter 30 mm; packing height: 2 m; packings: 4 × 4 mm wire mesh rings) and is provided with an electrical adiabatic jacket heating system to compensate for the heat losses.

Above the column there is the condenser which is fed with heat transfer oil (temperature: about 20° C below the boiling point of the top product). The distillate is separated into reflux and discharged product by electronically controlled reflux proportionators. The top product is collected in heated distillate receivers and is withdrawn from the installation in fractions.

All parts of the apparatus which come into contact with the product are provided with double jackets through which thermostatically controlled heat transfer oil flows.

The following fractions are withdrawn at a sump temperature of 280° C (initially) to 320° C (finally), a top vacuum of 10 mm Hg and a reflux/discharge ratio of 20/1.

1st main fraction: at a top temperature of 235° C = 220 g of 97% pure 2-chloroanthraquinone.

1st intermediate fraction: 234 g containing 44% of 2-chloroanthraquinone and 56% of 1-chloroanthraquinone.

2nd main fraction at 245° C = 130 g of 95% pure 1-chloroanthraquinone.

2nd intermediate fraction: 97 g containing 52% of 1-chloroanthraquinone and 48% of 1,6/1,7-dichloroanthraquinone.

3rd main fraction at 263° C = 241 g of a 92% pure mixture of 1,6- and 1,7-dichloroanthraquinone.

3rd intermediate fraction: 380 g containing 56% of 1,6 1,7-dichloroanthraquinone and 44% of 1,5- and 1,8-dichloroanthraquinone.

4th main fraction at 269° C = 45 g of a 92% pure mixture of 1,5- and 1,8-dichloroanthraquinone.

Residue 153 g.

The intermediate fractions obtained can be separated by distillation in a second distillation stage, under similar conditions.

EXAMPLE 2 a. A mixture of 1,400 g of dichloroanthraquinones [56% of 1,6- and 1,7-isomers and 44% of 1,5- and 1,8-isomers; obtained by distillation according to Example 1] and 600 g of a dinitroanthraquinone mixture, such as arises, for example, as the sump product on dinitration of anthraquinone (compare Example 2c) are fused in a double-jacketed glass reaction vessel (length: 450 mm; internal diameter: 80 mm), equipped with a bottom frit (D2), the vessel being preheated to 240° C (heating by means of a circulatory thermostatic system), and the fusion being carried out with introduction of nitrogen and whilst supplying heat. Chlorine is passed into this melt (46 1/hour) until no further nitrous gases are evolved and dinitroanthraquinones are no longer detectable by thin layer chromatography (about 80 minutes).

The reaction melt is poured onto an enamelled metal sheet and is comminuted after it has solidified. A dichloroanthraquinone mixture consisting of 56% of 1,6- and 1,7-isomers and 44% of 1,5- and 1,8-isomers is obtained.

b. 1,000 g of this mixture are employed in the flask of the experimental apparatus described in Example 1, but which has been lengthened by 1 m packing height, and are rectified using a top vacuum of 5 mm Hg and are reflux ratio of 30/1. It proves possible to isolate the following products.

1st main fraction at a top temperature of 245° C =452 g of a 94% pure mixture of 1,6- and 1,7-dichloroanthraquinone.

1st intermediate fraction = 210 g of a mixture containing 48% of 1,6- and 1,7-dichloroanthraquinone and 52% of 1,5- and 1,8-dichloroanthraquinone.

2nd main fraction = 198 g of a 92% pure mixture of 1,5- and 1,8-dichloroanthraquinone (residue: 140 g).

The intermediate fraction can be re-used and distilled. The temperature in the flask rises from an initial value of 290° C to 315° C at the end of the distillation (at about 25 mm Hg).

c. The dinitroanthraquinone mixture employed in Example 2a can be prepared, for example, as follows:

300 g of 99% strength anthraquinone are introduced into 1.2 l of 98% strength HNO$_3$ at 40° C. The mixture is stirred for a further 3 hours at 40° to 42° C and 1 hour at 65° to 70° C. The reaction product is filtered off. Filter residue I and filtrate I are obtained.

Filter residue I is stirred with 300 ml of 98% strength HNO$_3$ for 1 hour at 65° to 70° C and then for 2 hours until cold, and the product is filtered off and washed with 98% strength HNO$_3$. A moist filter residue and an extract are obtained. The filter residue, after washing until neutral and drying, gives 129.4 g of 1,5-dinitroanthraquinone. Sufficient HNO$_3$ is distilled off the filtrate I at 60° to 70° C to leave 75% by weight of residue. This is stirred for a further 2 hours and the product is filtered off and washed with 80% strength HNO$_3$. This gives filter residue II and filtrate II. Filter residue II, when washed until neutral and dried, gives 65 g of 1,8-dinitroanthraquinone.

filtrate II is combined with the extract from above and sufficient nitric acid is distilled off to leave 65% by weight of residue; this is stirred for 2 hours until cold, and the product is filtered off and washed with 80% strength HNO$_3$. Filter residue III and filtrate III were obtained.

The filter residue III consists of 1,5- and 1,8-dichloroanthraquinone. The filtrate III is evaporated to dryness in a partial vacuum at 60° C. 136.2 g (analysis: 22.8% of 1,6-dinitroanthraquinone and 23.4% of 1,7-dinitroanthraquinone) of sump product from the dinitration remain.

EXAMPLE 3

50 g of 1,6(1,7)-dichloroanthraquinone (94% pure) are dissolved in 150 ml of nitrobenzene at 100° C and 100 mg of copper powder are added. Methylamine is passed into this solution at 115°-120° C until no further starting material is detectable in a sample which has been withdrawn and chromatographed (about 6 hours being required). When the temperature has dropped to 70° C, the mixture is diluted with 150 ml of methanol, the whole is stirred for a further 3 hours at 20°-25° C and the product is filtered off and washed successively with 50 ml of a mixture of equal parts of nitrobenzene and methanol, with methanol and with water. After drying, 35.4 g of a mixture of pure 1-methylamino-6- and -7-chloroanthraquinone are obtained, representing 75% of theory.

EXAMPLE 4

50 g of 1,6(1,7)-dichloroanthraquinone (94% pure) and 220 g of 15% strength aqueous ethylamine solution are heated for 3 hours in an autoclave at 140° C, whilst stirring well. After releasing the pressure, the reaction mixture is filtered at room temperature and the product is washed with water and dried.

Yield: 47.8 g of a 90% pure 1-ethylamino-6(7)-chloroanthraquinone (89% of theory).

If the procedure indicated above is followed but instead of ethylamine 360 g of 15% strength aqueous butylamine solution are employed, 53.9 g of an 87% pure 1-butylamino-6(7)-chloroanthraquinone (88% of theory) are obtained.

EXAMPLE 5

A mixture of 60 g of 1,6(1,7)-dichloroanthraquinone (94% pure), 180 ml of nitrobenzene, 120 ml of 100% pure isopropylamine, 27.6 g of anhydrous potassium acetate and 200 mg of copper powder is heated for 5 hours at 150° C in an autoclave. Thereafter, no further starting material is detectable by thin layer chromatography. This reaction mixture is concentrated to a volume of about 250 ml in a rotary evaporator, then diluted with 250 ml of methanol at 20°-25° C and stirred for 1 hour at the same temperature. The product is then filtered off and washed successively with 50 ml of a mixture of equal parts of nitrobenzene and methanol, with methanol and with water, 36.5 g of pure 1-isopropylamino-6(7)-chloroanthraquinone, representing 60% of theory, are obtained.

If the procedure indicated is followed but isopropylamine is replaced by propylamine, 22 g of 1-propylamino-7-chloroanthraquinone are obtained. The nitrobenzene/methanol mother liquor is concentrated and the residue is treated with methanol and with a little nitrobenzene. After working up, 8 g of 1-propylamino-6-chloroanthraquinone are obtained.

EXAMPLE 6

45 g of 1,6(1,7)-dichloroanthraquinone (94% pure) in 180 ml of hexylamine are stirred with 20 g of anhydrous potassium acetate and 100 mg of copper powder for 5 hours at 90°-95° C. When the temperature has dropped at 70° C, the mixture is diluted with 320 ml of methanol, the whole is stirred for a further hour at 20°-25° C and the product is filtered off and washed successively with 100 ml of a mixture of methanol/hexylamine (64/36), with methanol and with water. After drying, 45.5 g of a mixture of pure 1-hexylamino-6-and -7-chloroanthraquinone, representing 82% of theory, are obtained.

EXAMPLE 7

45 g of 1,6(1,7)-dichloroanthraquinone (94% pure), 20 g of anhydrous potassium acetate, 100 mg of copper powder and 135 ml of cyclohexylamine are kept for 7 hours at 110°–115° C, whilst stirring well. Thereafter, no further starting material is detectable chromatographically.

When the temperature has dropped to 70° C, the mixture is diluted with 200 ml of methanol, the whole is stirred for a further hour at 20°–25° C and the product is filtered off and washed successively with 30 ml of a mixture of equal parts of methanol and cyclohexylamine, with methanol and with water. 43.2 g of a mixture of practically pure 1-cyclohexylamino-6- and -7-chloroanthraquinone, representing 78.3% of theory, are obtained.

EXAMPLE 8

15 g of 1,6(1,7)-dichloroanthraquinone (94% pure), 60 ml of β-phenylethylamine, 6.65 g of anhydrous potassium acetate and 100 ml of copper powder are heated to 90°–95° C whilst stirring (reaction time about 5 hours) until, according to thin layer chromatography, no further starting material is present. When the temperature has dropped to 70° C, 60 ml of methanol are added, the mixture is stirred for a further 3 hours at 20°–30° C and the product is filtered off and washed with 25 ml of a 1:1 mixture of methanol and β-phenylethylamine and then with methanol and with water. 14.7 g (75% of theory) of a practically pure mixture of 1-β-phenylethylamino-6- and -7-chloroanthraquinone are obtained.

If the procedure indicated above is followed but the β-phenylethylamine is replaced by the corresponding amount of α-phenylethylamine and the reaction temperature is kept at 125°–130° C, pure 1-α-phenylethylamino-6(7)-chloroanthraquinone is obtained in 68.5% yield.

EXAMPLE 9

A mixture of 15 g of 1,6(1,7)-dichloroanthraquinone, 75 g of p-toluidine, 6.65 g of anhydrous potassium acetate and 100 mg of copper powder is heated to 148°–152° C, whilst stirring, until, according to thin layer chromatography, no further starting material is present. The mixture is diluted with 75 ml of a 1:1 mixture of methanol and p-toluidine and then with methanol and water. After drying, 10.1 g (54% of theory) of a mixture of 1-p-toluidino-6- and -7-chloroanthraquinone are obtained.

If 1,6(1,7)-dichloroanthraquinone is reacted with aliphatic, cycloaliphatic, araliphatic or aromatic amines in accordance with one of the instructions indicated in Examples 3 to 9, the compounds (6,7-chloro-isomer mixtures) of the formula

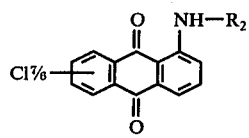

which are shown in the Table are obtained; these dye polyester fibres and plastics, in accordance with one of the instructions given in Examples 44–45, in red-violet shades.

Table

| Example | $R_2$ |
|---|---|
| 10 | $-CH_2-CH_2-OH$ |
| 11 | $-CH-(CH_2-CH_3)_2$ |
| 12 | $-CH(CH_3)-CH_2-CH_3$ |
| 13 | $-CH_2-CH_2-CN$ |
| 14 | $-CH(CH_2-CH_2-C_6H_5)(CH_2-CH(CH_3)_2)$ |
| 15 | $-CH_2-CH_2-OCH_3$ |
| 16 | $-CH_2-CH_2-NH_2$ |
| 17 | $-CH_2-CH_2-Cl$ |
| 18 | $-CH_2-CH=CH_2$ |
| 19 | $-(CH_2)_{11}-CH_3$ |
| 20 | cyclohexyl-$CH_3$ |
| 21 | cyclohexyl-$C(CH_3)_3$ |
| 22 | cyclohexyl-cyclohexyl |
| 23 | bicyclic $CH_2$ bridge |
| 24 | 3,3,5-trimethylcyclohexyl |
| 25 | cyclohexyl-cyclohexyl |
| 26 | cyclohexyl-$OCH_3$ |
| 27 | cyclohexyl-$NH_2$ |
| 28 | cyclohexyl-O-phenyl |
| 29 | cyclohexyl with $CH_2$, $CH_3$, $CH_3$, $CH_3$ substituents |
| 30 | $-CH_2$-phenyl |
| 31 | $-CH(CH_3)-CH_2-CH_2$-phenyl |
| 32 | $-CH(CH_3)-CH_2-C(CH_3)_2$-phenyl |
| 33 | $-CH_2-CH_2-C(CH_3)_2$-phenyl |
| 34 | phenyl |
| 35 | phenyl-$OCH_3$ |
| 36 | phenyl-$C(CH_3)_3$ |

| Example | R₂ |
|---|---|
| 37 | 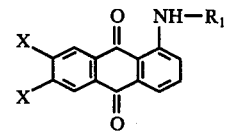 |
| 38 | CH₃ <br> (trimethylphenyl group with three CH₃) |
| 39 | (phenyl-cyclohexyl) |
| 40 | (phenyl-NH₂) |
| 41 | NH₂ (benzyl-NH₂) |
| 42 | (phenyl-NH—COCH₃) |
| 43 | (phenyl-NH—CH₃) |

EXAMPLE 44 a. 75 g of 1-isopropylamino-6(7)-chloroanthraquinone obtained according to Example 5, 50 g of an anionic dispersing agent, for example of a ligninsulphonate or of a condensation product of naphthalenesulphonic acid and formaldehyde, and 100 ml of water are mixed and converted to a finely divided form by grinding for 10 hours in a ball mill.

The dispersion thus obtained, which contains approx. 30% of crude dyestuff, is stable on storage.

b. The aqueous dispersion obtained according to a) can be converted to a printing paste as follows:

50–200 g are worked into a paste with 400 g of a 10% strength carob bean flour ether thickener and 550–400 ml of water.

c. Using this printing paste, a paper is printed by the gravure printing process. If this paper is pressed against a textile of polyester fibres for 20 seconds at 200° C, a clear, deep red print having good fastness properties, above all good fastness to light, is obtaind.

EXAMPLE 45

100 g of polystyrene granules and 0.02 g of 1-methylamino-6(7)-chloroanthraquinone (obtained according to Example 3) are mixed thoroughly in a tumbler mixer for 15 minutes. The dry-coloured granules are processed on a screw injection moulding machine at 240° C. Transparent, bluishtinged red sheets of good fastness to light and to weathering and high heat stability are obtained. Instead of polystryrene polymers, copolymers with butadiene and acrylonitrile can also be used.

EXAMPLE 46

0.015 g of 1-cyclohexylamino-6(7)-chloroanthraquinone (obtained according to Example 7) and 100 g of polymethylmethacrylate are mixed dry and homogenised on a single-screw extruder at 230° C. The material which issues as a ribbon from the extruder is granulated. It can subsequently be moulded into shapes. A transparent core material which has been dyed bluish-tinged red and has good fastness to light and to weathering is obtained.

We claim:

1. Anthraquinone compounds of the formula

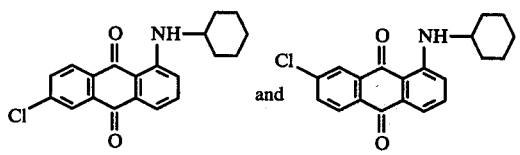

as well as their mixtures, wherein $R_1$ represents cyclopentyl, cycloheptyl, cyclohexyl, methylcyclohexyl, dimethylcyclohexyl, trimethylcyclohexyl, chlorocyclohexyl, benzyl, α-phenylethyl, β-phenylethyl, chlorobenzyl, methylbenzyl or methoxybenzyl; and one X represents chlorine and the other X represents hydrogen.

2. Compounds according to claim 1, of the formulae

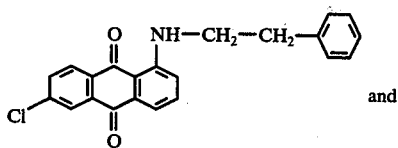

as well as their mixtures.

3. Compounds according to claim 1, of the formulae

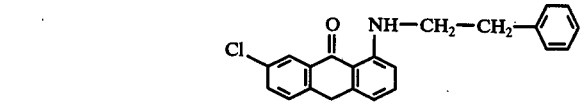

as well as their mixtures.

4. Compounds according to claim 1, of the formulae

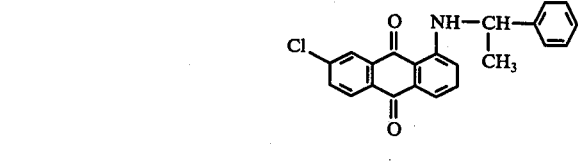

as well as their mixtures.

5. Compounds according to claim 1 as well as their mixture in which $R_1$ is benzyl.

* * * * *